June 3, 1969　　　M. W. KEYMER　　　3,447,580

HAND CUTTING TOOL AND HOLDER

Filed Oct. 16, 1967

INVENTOR.
MARK W. KEYMER
BY
Williamson, Palmatier
& Bains
ATTORNEYS

United States Patent Office 3,447,580
Patented June 3, 1969

3,447,580
HAND CUTTING TOOL AND HOLDER
Mark W. Keymer, Hopkins, Minn., assignor to Malco Products, Inc., Minneapolis, Minn., a corporation of Minnesota
Filed Oct. 16, 1967, Ser. No. 675,648
Int. Cl. B27b *21/08;* B26b *1/00;* B25g *1/00*
U.S. Cl. 145—108        5 Claims

ABSTRACT OF THE DISCLOSURE

A hollow, elongate handle and holder for a tool such as a hacksaw blade has two blade retention arms extending forwardly from the open, front end thereof, one of said retention arms being a stationary member fixed at its inner end to the handle and the other retention arm being removably inserted in the forward end of the handle. The retention arms are closely spaced at their inner ends and are fastened together at their outer ends by a removable fastener so as to provide for the adjustment and proper support of a saw blade extending therebetween. The elongate handle is enclosed throughout its length by a plastic covering sheath which is provided with a slot at its outer end, the side walls of which serve to grip and support the rear segment of a saw blade extending therethrough.

---

This invention relates to an improved tool holder of the type comprising an elongated handle in which a tool such as a hacksaw blade is removably supported.

My improved blade holder is particularly characterized by an arrangement of blade retention and clamping members which are removably secured together in such a way as to permit a cutting blade to be adjusted to any desired lengthwise position within the holder, the retention members serving to provide the necessary support for the cutting blade at spaced points along its length. In the preferred form of my invention, the blade retention members are in the form of two arms which project forwardly from the front end of a tool holder and are removably fastened together at their outer ends so as to grip a cutting tool therebetween. The inner ends of the arms extend within the front, open end of the tool holder, and are spaced close enough together to provide support for a cutting tool which extends between them.

One of the particularly advantageous features of my invention is that one of the aforesaid retention arms is removably inserted in the tool holder. By removing the fastening means which holds the outer ends of the retention arms together in clamping engagement with a saw blade, the removable arm may be withdrawn from the tool holder so as to facilitate the removal of the saw blade or other tool and the cleaning and servicing of the holder.

A further unique, and beneficial feature of my invention is provided by means of a plastic covering sheath which extends over substantially the whole length of the elongated tool holder. The back end of the plastic sheath is slotted so that a saw blade may be extended therethrough when it is desired to have only a small section of the blade projecting forwardly of the handle for cutting purposes. The resilient, plastic side walls of the slot grip inwardly on the rear end of the saw blade and prevent it from moving laterally when a sawing operation is being carried out.

These and other objects and advantages of my invention will become readily apparent as the following description is read in conjunction with the accompanying drawings, of which:

Figure 1:
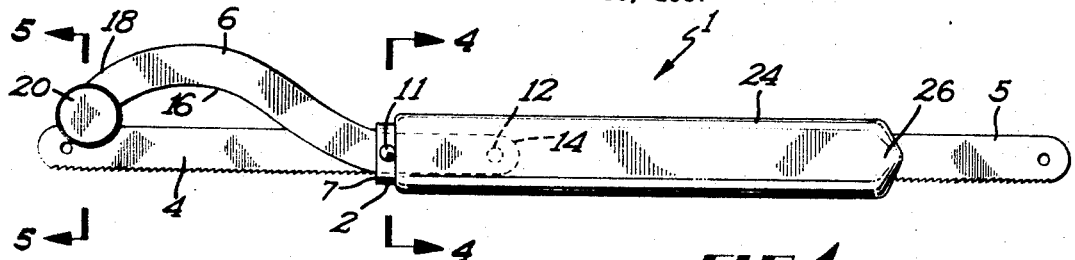
FIGURE 1 is a side elevation view of the hand cutting tool of this invention.
Figure 2:
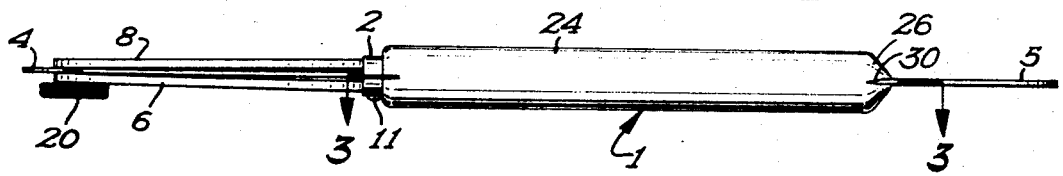
FIGURE 2 is a top view of the cutting tool of FIGURE 1.
Figure 3:
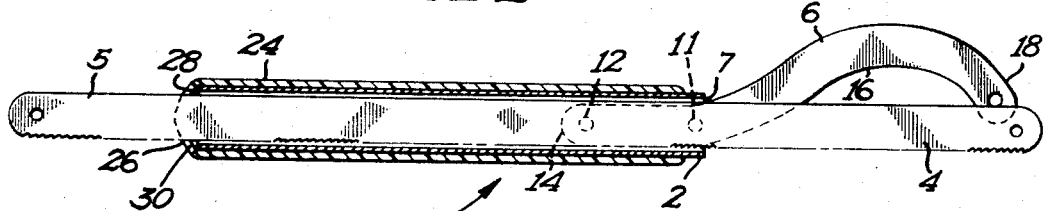
FIGURE 3 is a rear elevation view of the cutting tool with a portion in cross section as indicated by lines 3—3 on FIGURE 2.
Figure 4:
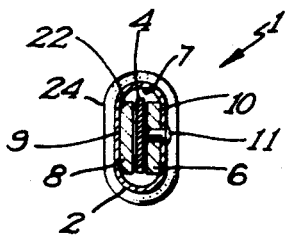
FIGURE 4 is a vertical section view taken along lines 4—4 of FIGURE 1.
Figure 5:
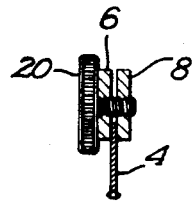
FIGURE 5 is a vertical section view taken along lines 5—5 of FIGURE 1.

The tool holder of this invention has been designed with the primary objective in mind of providing a cutting tool which is compact, easy to manipulate and readily adaptable to a variety of cutting or filing applications. For purposes of illustration, the tool holder of this invention has been shown with a flexible, hacksaw blade mounted therein. Referring now to FIGURES 1 through 6, the tool holder is generally indicated by reference numeral 1, and is comprised of a hollow, elongate member in the form of a length of rigid tubing 2. For the purpose of gripping and securely supporting a cutting tool such as flexible, hacksaw blade 4, I provide a pair of blade retention members in the form of arms 6 and 8 projecting forwardly from the open front end 7 of tube 2. As is most clearly indicated in FIGURE 4, opposite side walls 9 and 10 of rigid tube 2 are flattened so as to better accommodate the flat side walls of arms 6 and 8. Clamping arm 6 is stationary, and is firmly secured at its inner end 14 to flat side wall 10 of tubing 2 as by rivets 11 and 12. Arm 6 is provided with an upwardly arching contour 16 as shown. The other blade clamping arm 8 has an identical contour so as to assure a minimum of interference with a work piece through which saw blade 4 is cutting. Arms 6 and 8 are removably fastened together at their downwardly depending outer ends 18 by any convenient fastening means such as thumb screw 20. Thumb screw 20 draws outer end portions 18 of arms 6 and 8 closely together into firm, gripping contact with the opposite sides of saw blade 4 extending theerbetween, as illustrated in FIGURE 5.

In order to provide for the convenient removal and installation of cutting tools within rigid tubing 2, retention arm 8 is removably inserted within open front end 7 of tubing 2. The top and bottom marginal edges of the inner shank portion of arm 8 are beveled at 22 as indicated in FIGURE 4 in order that they may more easily slide in and out along the top and bottom arched portions of tubing 2. To pull arm 8 out of tubing 2, it is only necessary to remove thumb screw 20 which holds arms 6 and 8 together at their outer ends. FIGURE 3 shows the tool holder with arm 8 removed. With arm 8 out of the way, it is much easier to remove blade 4 from tubing 2 and install a new blade or a different type of cutting tool. After arm 8 and cutting blade 4 have been removed, any foreign matter such as sawdust which may have accumulated within tubing 2 may easily be cleaned out. It will also be apparent to those skilled in the art, by reference to FIGURE 4, that with clamping arm 8 removed from tubing 2, a relatively large space will be provided between stationary arm 6 and opposite side wall 9 of tubing 2 within which a wider saw blade or a different type of tool such as a file could be accommodated. Such a wide tool could be clamped at its outer end between downwardly depending portion 18 of stationary arm 6 and a threaded washer utilized in place of removable arm 8. Thumb screw 20 would be employed as before to hold the washer and arm 6 in clamping engagement with the cutting tool. Thus, by using a combination of stationary arm 6 and removable clamping arm 8, I have provided a tool holder of considerable versatility which may be employed as a handle and holder for a variety of cutting tools such as hacksaw blades and files.

Figure 6:
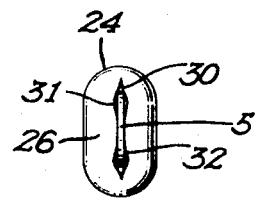
FIGURE 6 is an end view of the tool and tool holder shown in FIGURE 1.

For purposes of providing a protective casing and a handle grip, rigid tubing 2 is enclosed over substantially its entire length by an outer covering sheath 24 of plastic material. As is illustrated in FIGURES 3 and 6, plastic sheath 24 has an end portion 26 which extends outwardly beyond rear end 28 of tubing 2 in enclosing relationship therewith. A vertically extending slot 30 in end portion 26 of covering sheath 24 permits rear end portion 5 of blade 4 to be extended rearwardly therethrough. By loosening thumb screw 20, blade 4 may be moved in and out within tubing 2 to any desired position, and when only a short length of cutting edge is required, blade 4 may be adjusted to the position shown in FIGURES 1 through 3 with its rear end 5 extending through slot 30 in plastic covering sheath 24. Slot 30 performs an additional useful function in that it serves to support rear end 5 of blade 4. The flexible, resilient qualities of the plastic material of which covering sheath 24 is made causes side walls 31 and 32 of slot 30 to be biased towards each other in a normal position which tends to close slot 30. When blade 4 is pushed rearwardly through slot 30 it forces side walls 31 and 32 apart, and the inward, flexing action of side walls 31 and 32 causes them to firmly grip the opposite sides of blade end 5. Blade 4 is thus prevented from wobbling laterally within tubing 2 during a sawing operation.

Figure 7:
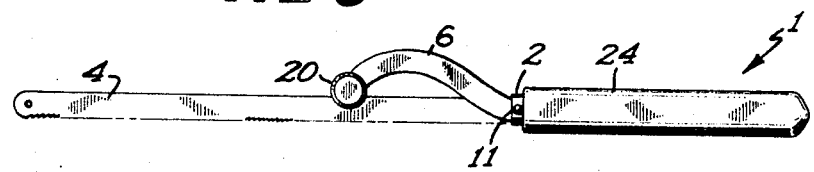
FIGURE 7 is a side elevation view of the hand tool of this invention shown with a flexible saw blade fully extended from the front end of the tool holder.
Figure 8:
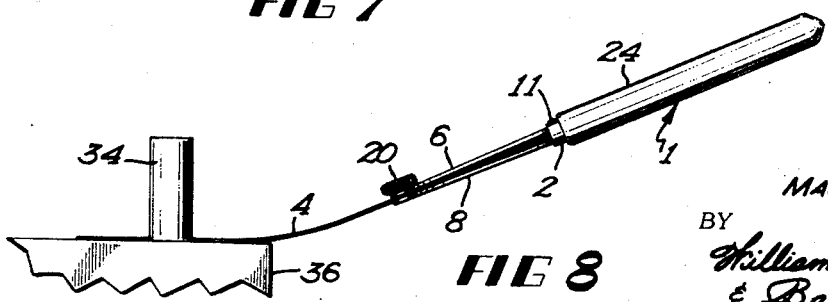
FIGURE 8 is a bottom view of the hand tool showing one manner in which the full extended saw blade of FIGURE 7 may be employed.

For certain types of cutting operations, it may be desirable to adjust flexible, hacksaw blade 4 by loosening thumb screw 20 so that the greater length of blade 4 extends outwardly from the front end of tubing 2 in the manner indicated in FIGURE 7. A long, free length of flexible saw blade would be useful in flush cutting operations. FIGURE 8 illustrates such an operation wherein it is desired to cut off a piece of tube or a stud 34 flush with a fixed mounting 36 such as a concrete footing. This operation can be accomplished with blade 4 fully extended by laying the outer end of blade 4 flush with fixed mounting 36 and exerting upward pressure on handle 1 so as to bend blade 4 in the manner indicated and hold its outer portion in firm engagement with fixed mounting 36. The particular manner in which the clamping arms 6 and 8 are positioned with respect to each other insures proper support for blade 4 when it is fully extended and subjected to a bending force during an operation as illustrated in FIGURE 8. The closely spaced positioning of inner end portions 14 of clamping arms 6 and 8 within the front end of rigid tubing 2 permits them to bear against blade 4 and support it at this point as well as at their outer ends 18.

On the basis of the foregoing disclosure, it will be seen that my improved tool handle and holder is particularly distinguished by its adaptability for holding and supporting a variety of cutting tools of varying widths, and its ability to provide proper support for the cutting tool regardless of the lengthwise position to which the tool is positioned within the holder. These desirable operating features are provided by means of the particular juxtaposition of blade retention members 6 and 8 at their inner and outer ends, and by the removable mounting of blade 8 within rigid tubing 2. Slot 30 in the end of plastic covering sheath 24 also contributes to the proper support of a cutting blade when the greater part of its length extends rearwardly through handle 1.

The particular embodiment of my invention which I have shown and described is illustrative only. I contemplate that those skilled in the art may devise various modifications to my improved tool holder which will be within the spirit and scope of my invention as defined by the following claims.

I claim:
1. A hand saw comprising in combination:
   an elongated hollow holder comprised of an inner length of rigid tubing and outer covering sheath of plastic material;
   a flexible saw blade extending lengthwise within said hollow holder;
   blade retention means projecting outwardly from said holder and adapted to grip said saw blade at a point forwardly of the front end of said holder; and wherein
   said covering sheath includes an end portion which extends outwardly beyond the rear end of said rigid tubing in covering relation thereto, said end portion having a slot therein through which the rear end of said saw blade may extend, the resilient characteristics of said plastic sheath causing the side walls of said slot to be biased inwardly in firm, gripping engagement with said saw blade extending therethrough.

2. A hand saw as defined in claim 1 wherein:
   said blade retention means comprises a pair of retention arms contained within and projecting forwardly from the front end of said rigid tubing, said retention arms being closely spaced together at the inner ends thereof within said rigid tubing so as to provide support for said flexible saw blade extending therebetween;
   and removable fastening means extending through the outer ends of said retention arms so as to bring said arms into clamping engagement with said flexible saw blade extending therebetween.

3. A hand saw as defined in claim 2 wherein:
   one of said retention arms is removably inserted within the front end of said rigid tubing, whereby said hand saw may be easily disassembled for service and cleaning by removing said fastening means and withdrawing said removable retention arm from said holder.

4. A handle and holder for a cutting tool comprising:
   an elongated handle having a longitudinally extending opening therein within which an elongated saw blade is removably received;
   a pair of blade retention arms extending forwardly from the front end of said handle and held together in clamping engagement with said saw blade at their outer ends by a removable fastener, each of said arms having inner end portions projecting into the forward end of said longitudinally extending opening in closely spaced relation to each other in position to restrainably engage said saw blade lying therebetween; and
   wherein one of said arms is permanently secured to said handle at its inner end portion, and the other one of said arms has its inner end portion slidably inserted within said handle opening and is removable therefrom by loosening said fastener.

5. A handle and holder for a cutting tool comprising:
   an elongated handle having a longitudinally extending opening therein for the reception of a tool having a cutting surface thereon, said handle being comprised of a length of rigid tubing contained within an outer covering sheath of plastic material;

a pair of cutting tool retention members extending forwardly from the front end of said handle and housed at their inner ends within said rigid tubing, said retention members being arranged in substantially parallel, closely spaced relationship, one of said members being in the form of a stationary arm fixed at its inner end to said handle, the other one of said members being removably secured to said arm at the outer end thereof for the retention of a cutting tool therebetween; and wherein said plastic covering sheath extends outwardly beyond and encloses the rear end of said rigid tubing, and is provided with a slot through which the rear end of a cutting tool may extend, the resilient sides of said slot serving to grip said cutting tool so as to prevent lateral movement thereof during a cutting operation.

References Cited
UNITED STATES PATENTS

| | | | |
|---|---|---|---|
| 208,593 | 10/1878 | Hansen et al. | 30—329 |
| 2,331,638 | 10/1943 | Taylor | 145—31 |

ROGERT C. RIORDON, *Primary Examiner.*

R. V. PARKER, JR., *Assistant Examiner.*

U.S. Cl. X.R.

30—333